United States Patent
Pan et al.

(10) Patent No.: US 11,064,344 B2
(45) Date of Patent: Jul. 13, 2021

(54) PHYSICAL ADDRESS-BASED COMMUNICATION METHOD, MOBILE TERMINAL AND COMMUNICATION DATABASE

(71) Applicant: ZTE Corporation, Nanshan Shenzhen (CN)

(72) Inventors: Jingya Pan, Nanshan Shenzhen (CN); Yu Zhang, Nanshan Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 101 days.

(21) Appl. No.: 16/490,337

(22) PCT Filed: Aug. 10, 2017

(86) PCT No.: PCT/CN2017/096906
§ 371 (c)(1),
(2) Date: Aug. 30, 2019

(87) PCT Pub. No.: WO2018/157556
PCT Pub. Date: Sep. 7, 2018

(65) Prior Publication Data
US 2020/0314630 A1    Oct. 1, 2020

(30) Foreign Application Priority Data
Mar. 1, 2017    (CN) .......................... 201710117050.1

(51) Int. Cl.
*H04W 4/00*    (2018.01)
*H04W 8/18*    (2009.01)
(Continued)

(52) U.S. Cl.
CPC ............ *H04W 8/183* (2013.01); *H04W 8/26* (2013.01); *H04W 12/06* (2013.01); *H04W 12/72* (2021.01);
(Continued)

(58) Field of Classification Search
CPC ................. H04W 8/183; H04W 76/11; H04W 12/00514; H04W 8/26; H04W 12/06;
(Continued)

(56) References Cited

U.S. PATENT DOCUMENTS

| | | | |
|---|---|---|---|
| 2010/0144350 A1* | 6/2010 | Walter | H04W 48/18 455/435.2 |
| 2012/0257003 A1 | 10/2012 | Jagdale et al. | |
| 2015/0072654 A1* | 3/2015 | Moshir | G06Q 10/10 455/411 |

FOREIGN PATENT DOCUMENTS

| | | |
|---|---|---|
| CN | 101459899 A | 6/2009 |
| CN | 102624742 A | 8/2012 |
| CN | 105554262 A | 5/2016 |

OTHER PUBLICATIONS

International Search Report dated Nov. 29, 2017 in corresponding International Application No. PCT/CN2017/096906; 8 pages.

* cited by examiner

*Primary Examiner* — Marcos Batista

(57) ABSTRACT

A physical address-based communication method, the method including: generating a user number of a mobile terminal according to a physical address of a preset module when the mobile terminal is in a first preset communication mode; wherein the user number includes a first user number and a second user number; generating by the mobile terminal an identification code of the mobile terminal according to the user number and a predetermined country code and a domestic destination code; controlling the mobile terminal to switch from the first communication mode to a second communication mode when the mobile terminal satisfies a preset communication condition; and communicating with a communication database using the identification code when the mobile terminal is in the second communication mode.

13 Claims, 6 Drawing Sheets

(51) Int. Cl.
*H04W 76/11* (2018.01)
*H04W 8/26* (2009.01)
*H04W 12/06* (2021.01)
*H04W 80/02* (2009.01)
*H04W 12/72* (2021.01)
*H04W 4/80* (2018.01)

(52) U.S. Cl.
CPC ............ *H04W 76/11* (2018.02); *H04W 80/02* (2013.01); *H04W 4/80* (2018.02)

(58) Field of Classification Search
CPC ......... H04W 80/02; H04W 4/80; H04W 8/18; H04W 8/22
USPC .......................................... 370/329; 455/312
See application file for complete search history.

PHYSICAL ADDRESS-BASED COMMUNICATION METHOD, MOBILE TERMINAL AND COMMUNICATION DATABASE

TECHNICAL FIELD

The disclosure relates to, but is not limited to, a communication technology field, and in particular, relates to a physical address-based communication method, a mobile terminal, and a communication database.

BACKGROUND

Among mobile terminals, all mobile terminals with a call function use a Subscriber Identification Module (SIM) card. A principle of using the SIM card for communication is that: the mobile terminal is equipped with a chip card with a microprocessor, and the chip card may store user information of the mobile terminal, an encrypted key, and an user's phone book and the like, so that the communication network may authenticate an user identity of the mobile terminal and encrypt voice information during a call. The general information of the chip card equipped with the microprocessor includes: system data stored by the SIM card manufacturer; network parameters and user data injected by the mobile operator or other operating divisions when issuing the SIM card to the user; incoming data stored by the users themselves, such as short messages, fixed dialing, abbreviated dialing, performance parameters, phone charge counts, etc. Whenever the mobile terminal is powered on, data communication with the SIM card is performed, thereby realizing a communication function of the mobile terminal.

SUMMARY

An embodiment of the disclosure provides a physical address-based communication method, the method including: generating a user number of a mobile terminal according to a physical address of a preset module when the mobile terminal is in a first preset communication mode, wherein the user number includes a first user number and a second user number; generating by the mobile terminal an identification code of the mobile terminal according to the user number and a predetermined country code and a domestic destination code; controlling the mobile terminal to switch from the first communication mode to a second communication mode when the mobile terminal satisfies a preset communication condition; and communicating with a communication database using the identification code when the mobile terminal is in the second communication mode.

In an exemplary embodiment, generating the user number of the mobile terminal according to the physical address of the preset module includes: generating, by the mobile terminal, the first user number according to a media access control (MAC) address of a WIFI module; or generating, by the mobile terminal, the second user number according to a Bluetooth address BD_ADDR of a Bluetooth module.

In an exemplary embodiment, before controlling the mobile terminal to switch from the first communication mode to the second communication mode, the method further including: sending, by the mobile terminal, the identification code to the communication database through a communication base station; and receiving by the mobile terminal through the communication base station, a judgment result delivered by the communication database and determined according to the identification code as to whether the mobile terminal satisfies the communication condition.

In an exemplary embodiment, before generating the user number of the mobile terminal according to the physical address of the preset module, the method further including: performing, by the mobile terminal, authentication for an user identity of the mobile terminal according to an authentication information input by an user and a preset authentication information; and performing by the mobile terminal, a step of generating the user number of the mobile terminal according to the physical address when the user identity is authenticated by the mobile terminal successfully.

In an exemplary embodiment, before communicating by the mobile terminal with the communication database using the identification code, the method further includes: unlocking the mobile terminal by the mobile terminal according to a decoding information input by the user and a preset decoding information; and performing by the mobile terminal a step of communicating with the communication database using the identification code when the mobile terminal is unlocked successfully.

An embodiment of the disclosure provides a physical address-based communication method, the method being applied to a communication database, the method includes: receiving an identification code of a mobile terminal sent by the mobile terminal through a communication base station; judging whether the mobile terminal satisfies a communication condition according to the identification code and a pre-stored target identification code; and sending, a judgment result to the mobile terminal through the communication base station.

In an exemplary embodiment, judging whether the mobile terminal satisfies the communication condition further includes: judging by the communication database, whether the identification code matches the target identification code successfully; judging by the communication database that the mobile terminal satisfies the communication condition when the identification code matches the target identification code successfully; and judging by the communication database that the mobile terminal does not satisfy the communication condition when the identification code fails to match the target identification code.

An embodiment of the disclosure also provides a mobile terminal, including: a generating unit, a switching unit, and a communication unit; wherein the generating unit is configured to, generate a user number of the mobile terminal according to a physical address of the preset module when the mobile terminal is in a preset first communication mode; and generate an identification code of the mobile terminal according to the user number and a predetermined country code and the domestic destination code, wherein the user number includes a first user number and a second user number; the switching unit is configured to, control the mobile terminal to switch from the first communication mode to a second communication mode when the mobile terminal satisfies a preset communication condition; and the communication unit is configured to, communicate with the communication database using the identification code when the mobile terminal is in the second communication mode.

In an exemplary embodiment, the generating unit is configured to generate the first user number according to a media access control (MAC) address of a WIFI module; or generate, the second user number according to a Bluetooth address BD_ADDR of the Bluetooth module.

In an exemplary embodiment, the mobile terminal further includes: a first sending unit and a first receiving unit;

wherein, the first sending unit is configured to send the identification code to the communication database through a communication base station; the first receiving unit is configured to receive through the communication base station, a judgment result delivered by the communication database and determined according to the identification code as to whether the mobile terminal satisfies the communication condition.

In an exemplary embodiment, the mobile terminal further includes: an authentication unit configured to perform authentication for an user identity of the mobile terminal according to an authentication information input by an user and a preset authentication information; the generating unit is configured to, generate the user number according to the physical address when the user identity is authenticated by the mobile terminal successfully.

In an exemplary embodiment, the mobile terminal further includes: a decoding unit configured to unlock the mobile terminal according to a decoding information input by the user and a preset decoding information; the communication unit is configured to communicate with the communication database using the identification code when the mobile terminal is unlocked successfully.

An embodiment of the disclosure provides a communication database, including: a second receiving unit, a judging unit, and a second sending unit; wherein, the second receiving unit is configured to receive an identification code of a mobile terminal sent by the mobile terminal through the communication base station; the judging unit is configured to judge, according to the identification code and a pre-stored target identification code, whether the mobile terminal satisfies a communication condition; and the second sending unit is configured to send a judgment result to the mobile terminal through the communication base station.

In an exemplary embodiment, the judging unit is configured to judge whether the identification code matches the target identification code successfully; judge that the mobile terminal satisfies the communication condition when the identification code matches the target identification code successfully; and judge that the mobile terminal does not satisfy the communication condition when the identification code fails to match the target identification code.

Embodiments of the disclosure also provide a computer readable storage medium storing computer executable instructions which, when executed, implement the above physical address-based communication method.

It can be seen that, in the technical solution of the embodiment of the disclosure, when the mobile terminal is in the first preset communication mode, the mobile terminal generates a user number of the mobile terminal according to the physical address of the preset module, generates an identification code of the mobile terminal according to the user number and the predetermined country code and the domestic destination code; the mobile terminal is controlled to switch from the first communication mode to the second communication mode when the mobile terminal satisfies a preset communication condition; when the mobile terminal is in the second communication mode, the mobile terminal communicates with the communication database using the identification code. That is, in the technical solution of the embodiments of the disclosure, the mobile terminal generates the user number of the mobile terminal according to the physical address of the preset module, generates the identification code of the mobile terminal according to the user number and the predetermined country code and the domestic destination code, so that the communication function of the mobile terminal may be realized by using the identification code. The physical address-based communication method and device proposed in the embodiments of the disclosure may not only realize the communication function of the mobile terminal more conveniently, but also increase the security of the user information in the mobile terminal. Meanwhile, the electronic pollution and the electronic waste caused by using the SIM card in the mobile terminal may also be avoided. Moreover, the technical solution of the embodiments of the disclosure is simple, convenient, easy to spread, and applicable to extensive range.

Other aspects will be apparent upon reading and understanding the drawings and detailed description.

DETAILED DESCRIPTION

Embodiments of the disclosure will be described below with reference to the accompanying drawings.

Figure 1A:
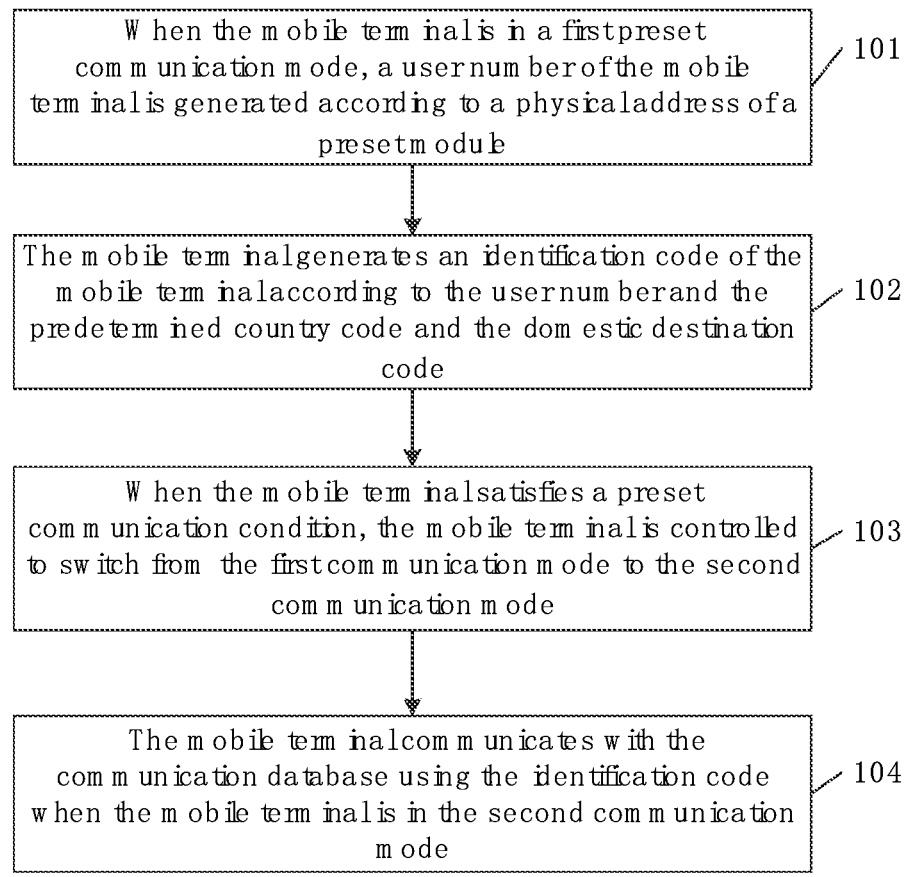
FIG. 1A is a schematic flowchart of an implementation of a physical address-based communication method according to an embodiment of the disclosure.

FIG. 1A is a schematic flowchart of an implementation of a physical address-based communication method according to an embodiment of the disclosure. As shown in FIG. 1A, the physical address-based communication method may include the following steps:

Step 101: When the mobile terminal is in a first preset communication mode, a user number of the mobile terminal is generated according to a physical address of a preset module.

In an optional embodiment of the disclosure, when the mobile terminal is in the first preset communication mode, the mobile terminal may generate a user number of the mobile terminal according to the physical address sent by the preset module; wherein the user number may include: a first user number and a second user number.

Optionally, in an optional embodiment of the disclosure, in the case of the mobile terminal generates the user number of the mobile terminal according to the physical address of the preset module, the mobile terminal may generate a first user number according to a Media Access Control (MAC)

address of a Wireless Fidelity (WIFI) module; or the mobile terminal may generate a second user number according to the BD_ADDR of a Bluetooth module. In general, the mobile terminal with the WIFI module and the Bluetooth module may have the MAC address or BD_ADDR, and these physical addresses are generally unique.

Optionally, in an optional embodiment of the disclosure, the mobile terminal may collect MAC address information of the mobile terminal WIFI module or the BD_ADDR of the mobile terminal Bluetooth module by means of an pre-installed identification system for physical information; then the mobile terminal may generate a first user number according to the MAC address of the WIFI module; or the mobile terminal may generate a second user number according to the BD_ADDR of the Bluetooth module; and the mobile terminal may further convert the first user number or the second user number into a preset data format, so as to generate the user number of the mobile terminal. In an optional embodiment of the disclosure, the mobile terminal may generate a user number of the mobile terminal according to the MAC address or BD_ADDR by adopting a generating method for a user number known in the art, and then the mobile terminal may generate an identification code of the mobile terminal according to a predetermined country code and domestic destination code. Optionally, in an optional embodiment of the disclosure, the identification code may be a MSISDN(Mobile Subscriber International ISDN/PSTN Number).

The MAC address of the WIFI module may be an address burned in the Network Interface Card (NIC), also called the hardware physical address. It consists of 48-bit long (6-byte), hexadecimal digits; the first 24 bits are called Organizationally Unique Identifier (OUI), which are codes assigned to different manufacturers by the registration administration organization of the Institute of Electrical and Electronics Engineers (IEEE) for distinguishing different manufacturers; the last 24 bits are called extended identifiers which are assigned by the manufacturers themselves. The last 24 bits of the MAC address in the network card produced by the same manufacturer are different. That is to say, in a physical transmission process in the low layer of the network, the host is identified by the physical address, which is generally globally unique. For example, a well-known Ethernet card whose physical address is an integer of 48 bits (bits), such as 44-45-53-54-00-00, which are stored in the host interface in a machine-readable manner. The Ethernet Address Management Authority (IEEE) divides the Ethernet address, that is, various combinations of the 48-bit, into several independent contiguous address groups. The manufacturers that manufacture the Ethernet NIC purchase one group of them, and the unique address may be assigned to the Ethernet NIC one by one during manufacturing by the manufacturers. Manufacturers of NICs, routers, WIFI wireless products, and Bluetooth wireless products may apply for OUI code for the products, that is, the manufacturer code of the MAC address. After the manufacturer obtains this code, the MAC address of the device may be formed by adding the code and the 24 bit manufacturer's own device number. In most cases, these MAC addresses may also be encoded and fixed by the manufacturer and the terminal device provider. The mobile terminal may store the 48 bits of the MAC address as an identification code, thereby enabling the identification code to be associated with the terminal device communication number, so as to achieve the same mobile phone communication function as the SIM card of the mobile phone. In this way, the existence manner of the terminal device SIM card may be abolished, and the user may communicate more conveniently.

In addition, the same physical address exists in Bluetooth wireless technology, that is, Bluetooth Device Address (BD_ADDR). BD_ADDR may be divided into three parts, namely, a Lower Address Part (LAP) of 24 bits, an Upper Address Part (UAP) of 8 bits, and a Non-significant Address Part (NAP) of 16 bits. Among them, NAP and UAP are the unique identification codes of the manufacturers, which may be assigned to different manufacturers by the authoritative department related to the Bluetooth-related standards; and the LAPs may be freely distributed internally by the manufacturers. For a certain type of terminal or device, the NAP and UAP of all individuals may be fixed, but LAP may be variable. There are 24 bits in the LAP. Generally speaking, allocation may be conducted from 0 to the 24th power of 2 by the manufacturer during manufacturing, thereby ensuring the difference between the addresses of the individuals.

In summary, the application of the uniqueness and reliability of the physical address of the WIFI module or the Bluetooth module inside the mobile terminal for the modern communication technology implementation may not only realize the communication function of the mobile terminal more conveniently, but also increase the security of user information in the mobile terminal. Meanwhile, the electronic pollution and electronic waste caused by use of SIM cards by mobile terminals may also be avoided.

Step 102: The mobile terminal generates an identification code of the mobile terminal according to the user number and the predetermined country code and the domestic destination code.

According to advice of CCITT, the Mobile Subscriber International ISDN/PSTN Number (MSISDN) may be composed of the following parts: MSISDN=CC+NDC+SN. Among them, CC(Country Code): means country code, because land mobile network spreads all over the world, the country code may naturally be used to distinguish mobile users in different countries. For example, China's country code is 86; NDC(National Destination Code): indicates domestic destination code, also known as the network access number. In order to protect the interests of consumers and allow reasonable market competition, each sovereign state may authorize one or more network operators to set up and operate mobile networks. For example, among the three largest mobile operators in China, the China Mobile Network access number includes 134·139, 150~152, 188, etc., China Unicom network access number includes 130-132, 185-186, etc., China Telecom network access number includes 133, 153, 180, 189, etc.; SN(Subscriber Number): means user number.

In an optional embodiment of the disclosure, after the mobile terminal generates the user number of the mobile terminal according to the physical address of the preset module, the mobile terminal may further generate an identification code of the mobile terminal according to the user number and the predetermined country code and the domestic destination code. Optionally, in an optional embodiment of the disclosure, the identification code may be the MSISDN.

Step 103: When the mobile terminal satisfies a preset communication condition, the mobile terminal is controlled to switch from the first communication mode to the second communication mode.

In an optional embodiment of the disclosure, when the mobile terminal satisfies a preset communication condition, the mobile terminal may be controlled to switch from the first communication mode to the second communication mode. Optionally, in an optional embodiment of the disclosure, after generating an identification code of the mobile terminal according to the user number and the predetermined country code and the domestic destination code, the mobile terminal may send the identification code to the communication database through a communication base station. The communication database may judge, according to the identification code and a pre-stored target identification code, whether the mobile terminal satisfies the communication condition; the mobile terminal may receive a judgment result delivered by the communication database through the communication base station. When the judgment result is that the mobile terminal satisfies the preset communication condition, the mobile terminal may be controlled to switch from the first communication mode to the second communication mode; when the judgment result is that the mobile terminal does not satisfy the preset communication condition, the mobile terminal may stop the physical address-based communication process.

Optionally, in an optional embodiment of the disclosure, in the case of the communication database judges whether the mobile terminal satisfies a preset communication condition, the communication database may judge whether the identification code and the target identification code match successfully; when the identification code and the target identification code match successfully, the communication database may judge that the mobile terminal satisfies the preset communication condition; when the identification code and the target identification code match unsuccessfully, the communication database may judge that the mobile terminal does not satisfy the preset communication condition. Optionally, in an optional embodiment of the disclosure, the communication database may judge whether the identification code is the same as the target identification code; when the identification code is the same as the target identification code, the communication database may judge that the mobile terminal satisfies the preset communication condition; when the identification code is different from the target identification code, the communication database may judge that the mobile terminal does not satisfy the preset communication condition.

Optionally, in an optional embodiment of the disclosure, before the identification code of the mobile terminal is generated according to the physical address of the preset module, the mobile terminal may further perform, according to an authentication information input by the user and a preset authentication information, authentication for the user identity of the mobile terminal. When the user identity is authenticated successfully by the mobile terminal, the mobile terminal may first generate a user number of the mobile terminal according to the physical address of the preset module, and then generate an identification code of the mobile terminal according to the user number and the predetermined country code and the domestic destination code; when the user identity is authenticated unsuccessfully by the mobile terminal, the mobile terminal may end the physical address-based communication process.

Step 104: The mobile terminal communicates with the communication database using the identification code when the mobile terminal is in the second communication mode.

In an optional embodiment of the disclosure, the mobile terminal may communicate with the communication database through the communication base station. For example, the mobile terminal may send the identification code to the communication database through the communication base station, or receive the judgment result sent by the communication database via the communication base station.

In an optional embodiment of the disclosure, the mobile terminal may communicate with the communication database using the identification code when the mobile terminal is in the second communication mode. Optionally, in an optional embodiment of the disclosure, the first communication mode may refer to a communication mode when the mobile terminal enters into an identification system of the physical information after the mobile terminal is powered on; and the second communication mode may refer to a communication mode when the mobile terminal device enters into a normal use interface. That is, when the mobile terminal enters into the communication mode for the identification system of the physical information, the mobile terminal may generate the user number of the mobile terminal according to the physical address of the WIFI module or the Bluetooth module, and then may generate an identification code of the mobile terminal based on the user number and the predetermined country code and the domestic destination code; when the mobile terminal device enters into the communication mode for a normal use interface, the mobile terminal may communicate with the communication database using the identification code.

Optionally, in an optional embodiment of the disclosure, before the mobile terminal communicates with the communication database via the communication base station, the mobile terminal may further be unlocked according to the decoding information input by the user and the preset decoding information; When the mobile terminal is unlocked successfully, the mobile terminal may communicate with the communication database through the communication base station; when the mobile terminal is unlocked unsuccessfully, the mobile terminal may end the physical address-based communication process.

Optionally, in an optional embodiment of the disclosure, when the mobile terminal communicates with the communication database for the first time, after the mobile terminal may read the MAC address of the WIFI module or the BD_ADDR of the Bluetooth module, the mobile terminal first generates the user number of the mobile terminal according to the MAC address or BD_ADDR, and then generates a unique identification code corresponding to the terminal device itself according to the user number and the predetermined country code and the domestic destination code, and stores the identification code as a user name of the personal account in the communication database. Subsequently, each time the mobile terminal communicates with the communication database, the corresponding account in the communication database may be called to conduct operation.

Optionally, in an optional embodiment of the disclosure, when the mobile terminal communicates with the communication database for the Nth time, the terminal device may normally communicate with the communication database after switching from the first communication mode to the second communication mode; that is, the user may enjoy a series of operations such as communication services using the mobile terminal without storing the identification code as a user name of the personal account in the communication database. Here, the Nth time may refer to the second time of the mobile terminal or any time after the mobile terminal is powered on for the first time.

It should be noted that the steps 101 to 103 in the embodiment of the disclosure are performed before the mobile terminal communicates with the communication database. Therefore, the mobile terminal may not normally communicate with the communication database temporarily when performing steps 101 to 103. That is to say, the mobile terminal may not enter the communication mode for the normal use interface temporarily, and therefore, the mobile terminal may not perform data transmission with the communication database in terms of voice service and data service.

It should be noted that when a failure occurs to the mobile terminal, the mobile terminal may re-identify the MAC address information of the WIFI core module or the BD_ADDR of the Bluetooth module; the mobile terminal may also re-identify the MAC address or the BD_ADDR when the mobile terminal replaces the WIDI module or the Bluetooth module which leads to changes of the physical address information thereof.

It can be known from the above description that, through the above steps 101 to 104, the mobile terminal may first generate the user number of the mobile terminal according to the physical address of the preset module, and then generates an identification code of the mobile terminal according to the user number and the predetermined country code and the domestic destination code when the mobile terminal is in the first preset communication mode, and the mobile terminal may be controlled to switch from the first communication mode to the second communication mode when the mobile terminal satisfies the preset communication condition. The mobile terminal may communicate with the communication database using the identification code when the mobile terminal is in the second communication mode. In the technical solution of the embodiment of the disclosure, not only the communication function of the mobile terminal can be implemented more conveniently, but also the security of the user information in the mobile terminal can be increased. Meanwhile, the electronic pollution and the electronic waste caused by the SIM card used in the mobile terminal can also be avoided.

Figure 1B:
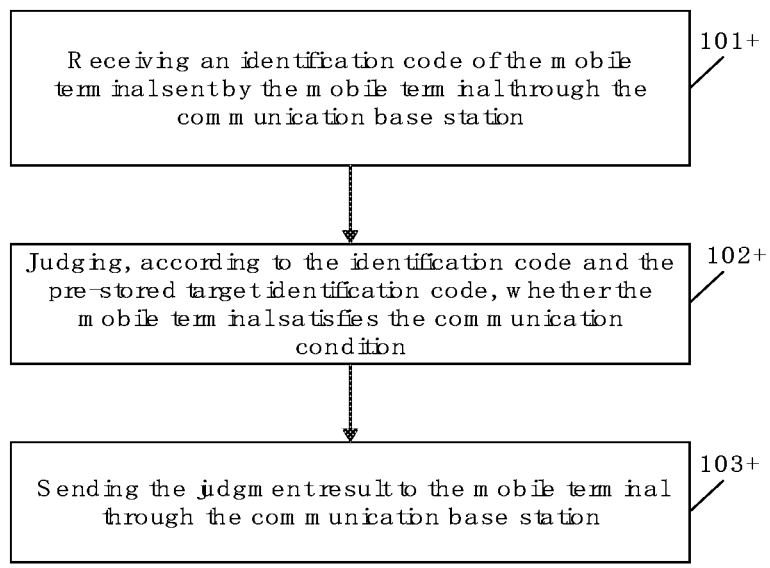
FIG. 1B is a schematic flowchart of another implementation of a physical address-based communication method according to an embodiment of the disclosure.

FIG. 1B is a schematic flowchart of another implementation of a physical address-based communication method according to an embodiment of the disclosure. As shown in FIG. 1B, the physical address-based communication method may be applied to a communication database, and may include the following steps:

Step 101+: Receiving an identification code of the mobile terminal sent by the mobile terminal through the communication base station;

Step 102+: Judging, according to the identification code and the pre-stored target identification code, whether the mobile terminal satisfies the communication condition.

Step 103+: Sending the judgment result to the mobile terminal through the communication base station.

Here, step 102+ may include:

Judging, by the communication database, whether the identification code and the target identification code match successfully;

When the identification code matches the target identification code successfully, determining by the communication database that the mobile terminal satisfies the communication condition;

When the identification code fails to match the target identification code, determining by the communication database that the mobile terminal does not satisfy the communication condition.

The above steps 101+ to 103+ corresponding to steps 101 to 104 performed by the mobile terminal, may be performed by the communication database side, and other descriptions for steps 101+ to 103+ may be referred to the descriptions for previous steps 101 to 104, which will not be repeated here.

In the physical address-based communication method provided by the embodiments of the disclosure, the mobile terminal generates a user number of the mobile terminal according to the physical address of the preset module, generates an identification code of the mobile terminal according to the user number and the predetermined country code and the domestic destination code when the mobile terminal is in the first preset communication mode, and the mobile terminal may be controlled to switch from the first communication mode to the second communication mode when the mobile terminal satisfies a preset communication condition; when the mobile terminal is in the second communication mode, the mobile terminal communicates with the communication database using the identification code. That is, in the technical solution of the embodiments of the disclosure, the mobile terminal generates a user number of the mobile terminal according to the physical address of the preset module, generates an identification code of the mobile terminal according to the user number and the predetermined country code and the domestic destination code, so that the communication function of the mobile terminal may be realized by using the identification code. The physical address-based communication method proposed in the embodiments of the disclosure may not only realize the communication function of the mobile terminal more conveniently, but also increase the security of the user information in the mobile terminal. Meanwhile, the electronic pollution and the electronic waste caused by using the SIM card in the mobile terminal may also be avoided. Moreover, the technical solution of the embodiments of the disclosure is simple, convenient, easy to spread, and applicable to extensive range.

Figure 2:
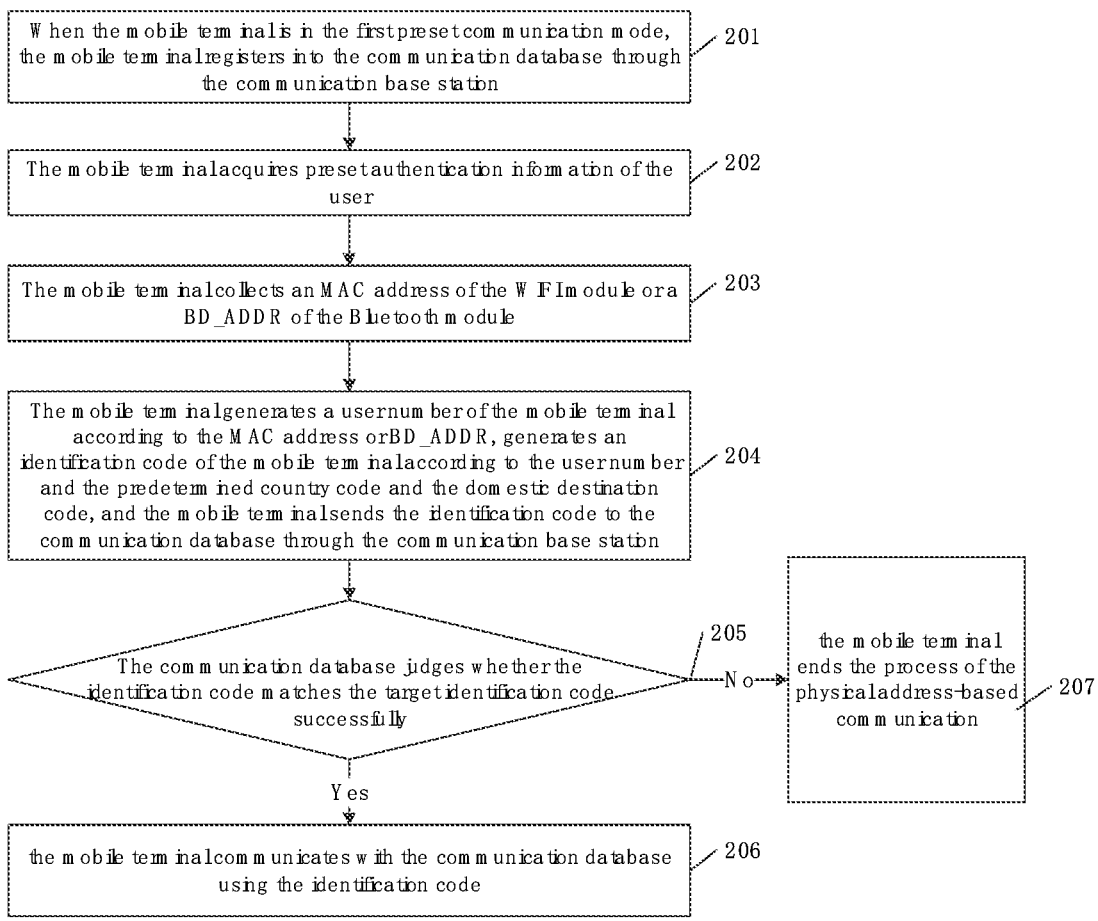
FIG. 2 is a schematic flowchart of an implementing method for a communication between the mobile terminal and the communication database for the first time in an embodiment of the disclosure.

FIG. 2 is a schematic flowchart of an implementing method for communication between the mobile terminal and the communication database for the first time in an embodiment of the disclosure. As shown in FIG. 2, the method for communication between the mobile terminal and the communication database for the first time may include the following steps:

Step 201: When the mobile terminal is in the first preset communication mode, the mobile terminal registers into the communication database through the communication base station.

Step 202: The mobile terminal acquires preset authentication information of the user.

In this step, the mobile terminal may collect the biometric information of the user as the preset authentication information of the user; or the password input by the user may be used as the preset authentication information of the user.

Step 203: The mobile terminal collects an MAC address of the WIFI module or a BD_ADDR of the Bluetooth module.

Step 204: The mobile terminal generates a user number of the mobile terminal according to the MAC address or BD_ADDR, generates an identification code of the mobile terminal according to the user number and the predetermined country code and the domestic destination code, and the mobile terminal sends the identification code to the communication database via the communication base station.

Step 205: The communication database judges whether the identification code matches the target identification code successfully.

Step 206: When the identification code matches the target identification code successfully, the mobile terminal communicates with the communication database using the identification code.

Step 207: When the identification code fails to match the target identification code, the mobile terminal ends the process of the physical address-based communication.

it can be known from the above description that, when the mobile terminal communicates with the communication database for the first time through the above steps 201-207, the mobile terminal may, after the mobile terminal reads the MAC address of the WIFI module or the BD_ADDR of the Bluetooth module, generates a user number corresponding to the terminal device itself first according to the MAC address or BD_ADDR, and then generates an identification code of the mobile terminal according to the user number and the predetermined country code and the domestic destination code, and stores the identification code as a user name of the personal account in the communication database. Subsequently, each time the mobile terminal communicates with the communication database, the corresponding account in the communication database may be directly called to conduct operation.

Figure 3:
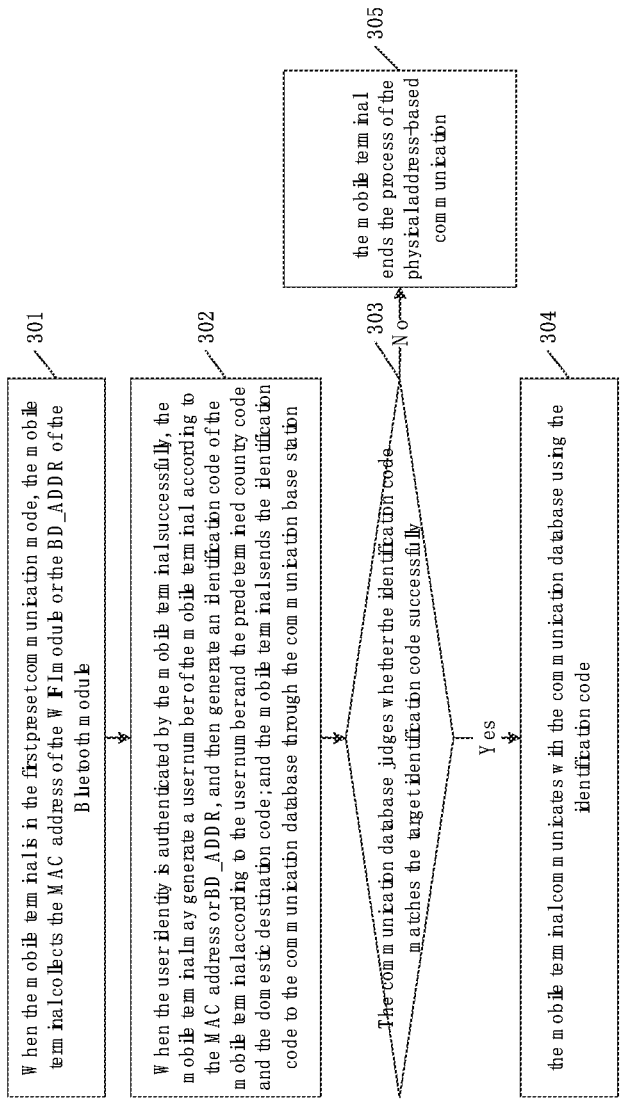
FIG. 3 is a schematic flowchart of an implementing method for a communication between the mobile terminal and the communication database for the Nth time in an embodiment of the disclosure.

FIG. 3 is a schematic flowchart of an implementing method for communication between the mobile terminal and the communication database for the Nth time in an embodiment of the disclosure. As shown in FIG. 3, the method for communication between the mobile terminal and the communication database for the Nth time may include the following steps:

Step 301: When the mobile terminal is in the first preset communication mode, the mobile terminal collects the MAC address of the WIFI module or the BD_ADDR of the Bluetooth module.

Step 302: When the user identity is authenticated by the mobile terminal successfully, the mobile terminal may generate a user number of the mobile terminal according to according to the MAC address or BD_ADDR, and then generate an identification code of the mobile terminal according to the user number and the predetermined country code and the domestic destination code; and the mobile terminal sends the identification code to the communication database via the communication base station.

Step 303: The communication database judges whether the identification code matches the target identification code successfully.

Step 304: When the identification code matches the target identification code successfully, the mobile terminal communicates with the communication database using the identification code.

Step 305: When the identification code fails to match the target identification code, the mobile terminal ends the process of the physical address-based communication.

it can be known from the above description that, when the mobile terminal communicates with the communication database for the Nth time through the above steps 301-305, the mobile terminal has no need to register in the communication database, and has no need to acquire the preset authentication information of the user. The mobile terminal may communicate with the communication database when the communication database judges that the identification code sent by the mobile terminal matches the target identification code successfully.

Figure 4:
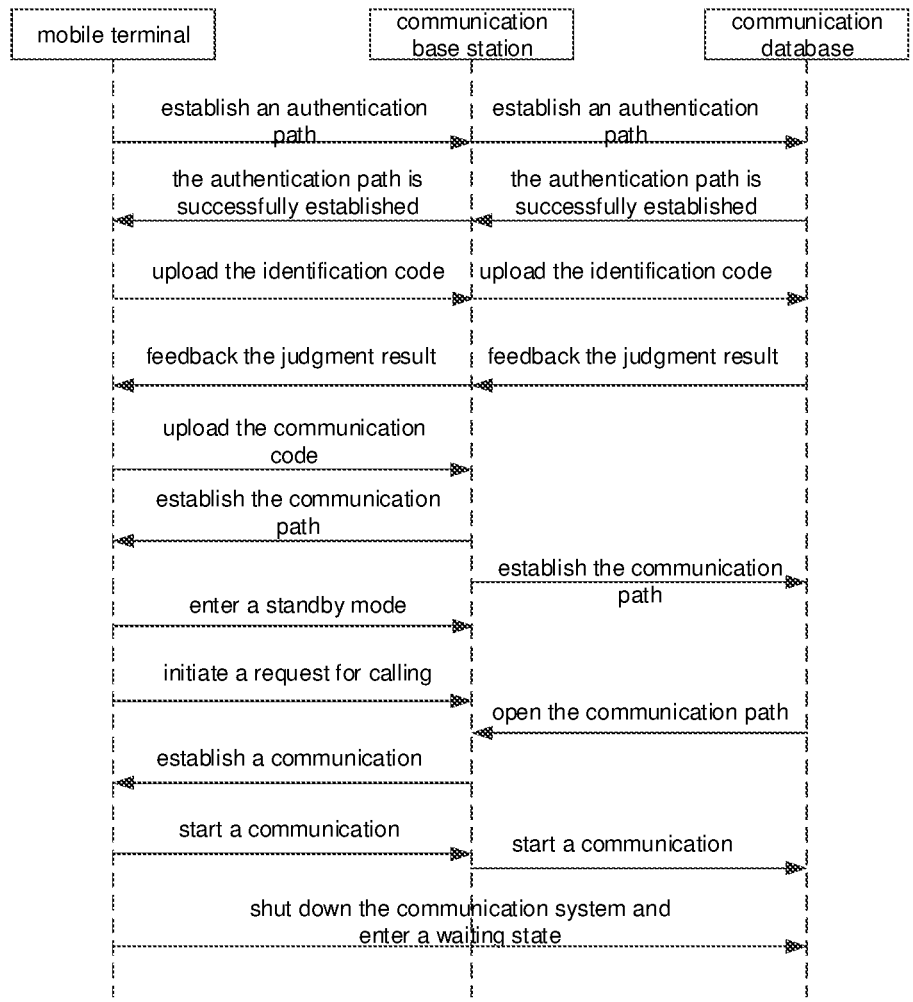
FIG. 4 is a schematic flowchart of a communication interaction between the mobile terminal and the communication database according to an embodiment of the disclosure.

The following describes an example of how a connection, a configuration and a communication can be made among a mobile terminal, a communication base station, and a communication database through a physical address. FIG. 4 is a schematic flowchart of a communication interaction between the mobile terminal and the communication database according to an embodiment of the disclosure. As shown in FIG. 4, when the mobile terminal is in the first communication mode, the mobile terminal may establish an authentication path to the communication database through the communication base station; after the authentication path is successfully established, the mobile terminal may send the identification code to the communication database through the communication base station; the communication database may judge, according to the identification code and the pre-stored target identification code, whether the mobile terminal satisfies a preset communication condition; the mobile terminal may receive a judgment result delivered by the communication database through the communication base station; when the mobile terminal satisfies the preset communication condition, the mobile terminal may be controlled to switch from the first communication mode to the second communication mode; when the mobile terminal is in the second communication mode, the mobile terminal may communicate with the communication database using the identification code; when the mobile terminal fails to satisfy the preset communication condition, the mobile terminal may end the process of the physical address-based communication.

In the physical address-based communication method provided by the embodiments of the disclosure, the mobile terminal generates a user number of the mobile terminal according to the physical address of the preset module, generates an identification code of the mobile terminal according to the user number and the predetermined country code and the domestic destination code when the mobile terminal is in the first preset communication mode; the mobile terminal is controlled to switch from the first communication mode to the second communication mode when the mobile terminal satisfies a preset communication condition; the mobile terminal communicates with the communication database using the identification code when the mobile terminal is in the second communication mode. That is, in the technical solution of the embodiments of the disclosure, the mobile terminal generates a user number of the mobile terminal according to the physical address of the preset module, generates an identification code of the mobile terminal according to the user number and the predetermined country code and the domestic destination code, so that the communication function of the mobile terminal may be realized by using the identification code. The physical address-based communication device proposed in the embodiments of the disclosure may not only realize the communication function of the mobile terminal more conveniently, but also increase the security of the user information in the mobile terminal. Meanwhile, the electronic pollution and the electronic waste caused by using the SIM card in the mobile terminal may also be avoided. Moreover, the technical solution of the embodiments of the disclosure is simple, convenient, easy to spread, and applicable to extensive range.

Figure 5:
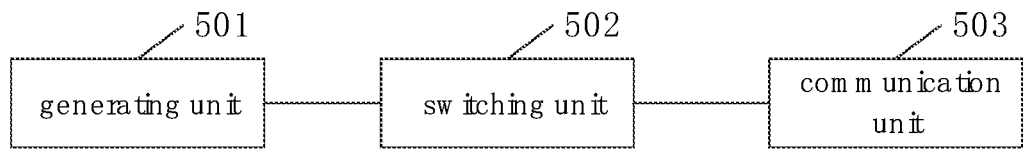
FIG. 5 is a schematic structural diagram of a first composition of the mobile terminal according to an embodiment of the disclosure.

FIG. 5 is a schematic structural diagram of a first composition of the mobile terminal according to an embodiment of the disclosure. As shown in FIG. 5, the mobile terminal includes: a generating unit 501, a switching unit 502, and a communication unit 503; wherein:

The generating unit 501 is configured to, generate a user number of the mobile terminal according to a physical address of the preset module when the mobile terminal is in a preset first communication mode; and generate an identification code of the mobile terminal according to the user number and a predetermined country code and the domestic destination code, wherein the user number includes a first user number and a second user number;

The switching unit 502 is configured to, control the mobile terminal to switch from the first communication mode to a second communication mode when the mobile terminal satisfies a preset communication condition; and The communication unit 503 is configured to, communicate with the communication database using the identification code when the mobile terminal is in the second communication mode.

Optionally, the generating unit 501 is configured to generate the first user number according to a MAC address of a WIFI module; or generate the second user number according to the BD_ADDR of the Bluetooth module.

Figure 6:
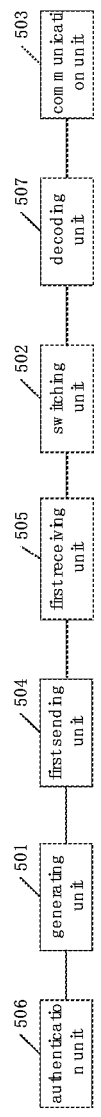
FIG. 6 is a schematic structural diagram of a second composition of the mobile terminal according to an embodiment of the disclosure.

FIG. 6 is a schematic structural diagram of a second composition of the mobile terminal according to an embodiment of the disclosure. As shown in FIG. 6, the mobile terminal may further include a first sending unit 504 and a first receiving unit 505; wherein:

The first sending unit 504 is configured to send the identification code to the communication database via a communication base station;

The first receiving unit 505 is configured to receive through the communication base station, a judgment result delivered by the communication database and determined according to the identification code as to whether the mobile terminal satisfies the communication condition.

Optionally, the mobile terminal further includes:

An authentication unit 506 configured to perform authentication for an user identity of the mobile terminal according to an authentication information input by an user and a preset authentication information;

The generating unit 501 is configured to, generate the user number according to the physical address when the user identity is authenticated by the mobile terminal successfully.

Optionally, the mobile terminal further includes:

A decoding unit 507 configured to unlock the mobile terminal according to the decoding information input by the user and a preset decoding information;

The communication unit 503 is configured to communicate with the communication database using the identification code when the mobile terminal is unlocked successfully.

Figure 7:
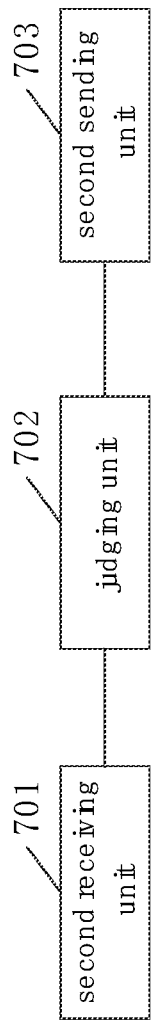
FIG. 7 is a schematic structural diagram of a composition of a communication database according to an embodiment of the disclosure.

FIG. 7 is a schematic structural diagram of a composition of a communication database according to an embodiment of the disclosure. As shown in FIG. 7, the communication database may include a second receiving unit 701, a judging unit 702, and a second sending unit 703;

The second receiving unit 701 is configured to receive an identification code of a mobile terminal sent by the mobile terminal through the communication base station;

The judging unit 702 is configured to judge, according to the identification code and a pre-stored target identification code, whether the mobile terminal satisfies a communication condition;

The second sending unit 703 is configured to send a judgment result to the mobile terminal through the communication base station.

Optionally, the judging unit 702 is configured to: judge whether the identification code matches the target identification code successfully; judge that the mobile terminal satisfies the communication condition when the identification code matches the target identification code successfully; and judge that the mobile terminal does not satisfy the communication condition when the identification code fails to match the target identification code.

the physical address-based communication device is provided by the embodiments of the disclosure. When the mobile terminal is in the first preset communication mode, the mobile terminal generates a user number of the mobile terminal according to the physical address of the preset module, generates an identification code of the mobile terminal according to the user number and the predetermined country code and the domestic destination code; the mobile terminal is controlled to switch from the first communication mode to the second communication mode when the mobile terminal satisfies a preset communication condition; when the mobile terminal is in the second communication mode, the mobile terminal communicates with the communication database using the identification code. That is, in the technical solution of the embodiments of the disclosure, the mobile terminal generates the user number of the mobile terminal according to the physical address of the preset module, generates the identification code of the mobile terminal according to the user number and the predetermined country code and the domestic destination code, so that the communication function of the mobile terminal may be realized by using the identification code. The physical address-based communication device proposed in the embodiments of the disclosure may not only realize the communication function of the mobile terminal more conveniently, but also increase the security of the user information in the mobile terminal, at the same time, the electronic pollution and the electronic waste caused by using the SIM card in the mobile terminal may also be avoided. Moreover, the technical solution of the embodiments of the disclosure is simple, convenient, easy to spread, and applicable to extensive range.

In actual applications, the generating unit 501, the switching unit 502, the communication unit 503, the first sending unit 504, the first receiving unit 505, the authenticating unit 506, and the decoding unit 507 may each be implemented by a central processing unit (CPU), a microprocessor (MPU), a digital signal processor (DSP), or a field programmable gate array (FPGA) or the like located in the mobile terminal; the second receiving unit 701, the judging unit 702, and the second sending unit 703 may each be implemented by a CPU, MPU, DSP, or FPGA or the like located in a communication database.

Embodiments of the disclosure also provide a non-transitory computer readable storage medium storing computer executable instructions which, when executed, implement the above physical address based communication method.

It will be appreciated by a person skilled in the art that embodiments of the disclosure may be provided as a method, system, or computer program product. Accordingly, the disclosure may take the form of a hardware embodiment, a software embodiment, or a combination of software and hardware embodiments. Moreover, the disclosure may take the form of a computer program product embodied on one or more computer-usable storage media (including but not limited to disk storage and optical storage, etc.) including computer usable program code.

The disclosure is described with reference to flowcharts, or block diagrams, or flowchart and block diagrams of methods, device (systems), and computer program products according to embodiments of the disclosure. It will be understood that each flow in the flowchart, or each block in the block diagram, or each of the flowcharts and blocks in the flowchart and the block diagram, a combination of the flows in the flowchart, a combination of the blocks in the block diagram, and a combination of the flowcharts in the flowchart and blocks in the block diagram. These computer program instructions may be provided to a processor of a general purpose computer, special purpose computer, embedded processor, or other programmable data processing device to produce a machine for the execution of instructions for execution by a processor of a computer or other programmable data processing device, so as to implement the functions specified in one or more flows of the flowchart, or one or more blocks of the block diagram, or at least one flow of the flowchart and at least one block of the block diagram.

The computer program instructions may also be stored in a computer readable memory that may direct a computer or other programmable data processing device to operate in a particular manner, such that the instructions stored in the computer readable memory generate manufactured products including an instruction apparatus. The instruction apparatus implements the functions specified in one or more flows of the flowchart, or one or more blocks of the block diagram, or at least one flow of the flowchart and at least one block of the block diagram.

These computer program instructions may also be loaded into a computer or other programmable data processing device such that a series of operational steps may be performed on a computer or other programmable device to produce computer-implemented processing, so that execution of the instructions on a computer or other programmable devices provides steps for implementing the steps of functions specified in one or more flows of the flowchart, or one or more blocks of the block diagram, or at least one flow of the flowchart and at least one block of the block diagram.

It will be appreciated by a person skilled in the art that all or some of the steps, systems, and functional blocks/units in the device of the methods disclosed above may be implemented as software, firmware, hardware, and suitable combinations thereof. In a hardware embodiment, the division between functional modules/units mentioned in the above description does not necessarily correspond to the division of physical components; for example, one physical component may have multiple functions, or one function or step may be performed by several physical components working together. Some or all of the components may be implemented as software executed by a processor, such as a digital signal processor or microprocessor, or as hardware, or as an integrated circuit, such as an application specific integrated circuit. Such software may be distributed on a computer readable medium, which may include computer storage media (or non-transitory media) and communication media (or transitory media). As is well known to a person skilled in the art, the term computer storage medium includes volatile and nonvolatile, removable and non-removable media implemented in any method or technology for storing information, such as computer readable instructions, data structures, program modules or other data. Computer storage media include, but are not limited to, Random Access Memory (RAM), Read-Only Memory (ROM), and Electrically Erasable Programmable Read-only Memory (EEPROM), flash memory or other memory technology, compact disc read-only memory (CD-ROM), digital versatile disc (DVD) or other optical disc storage, magnetic cassette, magnetic tape, disk storage or other magnetic storage device, or any other medium used to store the desired information and be accessed by the computer. Moreover, it is well known to a person skilled in the art that communication media typically includes computer readable instructions, data structures, program modules, or other data in a modulated data signal, such as a carrier wave or other transmission mechanism, and may include any information delivery media.

It may be understood by a person skilled in the art that the technical solutions of the disclosure may be modified or equivalent, without departing from the spirit and scope of the disclosure, and should be included in the scope of the claims of the disclosure.

INDUSTRIAL APPLICABILITY

In the technical solution of the embodiments of the disclosure, when the mobile terminal is in the first preset communication mode, the mobile terminal generates a user number of the mobile terminal according to the physical address of the preset module, generates an identification code of the mobile terminal according to the user number and the predetermined country code and the domestic destination code, and controls the mobile terminal to switch from the first communication mode to the second communication mode when the mobile terminal satisfies a preset communication condition; when the mobile terminal is in the second communication mode, it communicates with the communication database using the identification code. That is, in the technical solution of the embodiments of the disclosure, the mobile terminal generates a user number of the mobile terminal according to the physical address of the preset module, generates an identification code of the mobile terminal according to the user number and the predetermined country code and the domestic destination code, so that the communication function of the mobile terminal may be realized by using the identification code. The physical address-based communication device proposed in the embodiments of the disclosure may not only realize the communication function of the mobile terminal more conveniently, but also increase the security of the user information in the mobile terminal, at the same time, the electronic pollution and the electronic waste caused by using of the SIM card by the mobile terminal may also be avoided. Moreover, the technical solution of the embodiments of the disclosure is simple, convenient, easy to spread, and applicable to extensive range.

What is claimed is:

1. A physical address-based communication method, the method comprising:
   generating a user number of a mobile terminal according to a physical address of a preset module when the mobile terminal is in a first preset communication mode, wherein the user number comprises a first user number and a second user number;
   generating by the mobile terminal an identification code of the mobile terminal according to the user number and a predetermined country code and a domestic destination code;
   controlling the mobile terminal to switch from the first communication mode to a second communication mode when the mobile terminal satisfies a preset communication condition; and
   communicating with a communication database using the identification code when the mobile terminal is in the second communication mode.

2. The method according to claim 1, wherein generating the user number of the mobile terminal according to the physical address of the preset module comprises:
   generating, by the mobile terminal, the first user number according to a media access control (MAC) address of a WIFI module.

3. The method according to claim 1, before controlling the mobile terminal to switch from the first communication mode to the second communication mode, the method further comprising:

sending, by the mobile terminal, the identification code to the communication database through a communication base station; and receiving by the mobile terminal through the communication base station, a judgment result delivered by the communication database and determined according to the identification code as to whether the mobile terminal satisfies the communication condition.

4. The method according to claim 1, before generating the user number of the mobile terminal according to the physical address of the preset module, the method further comprising:

performing, by the mobile terminal, authentication for an user identity of the mobile terminal according to an authentication information input by an user and a preset authentication information; and performing by the mobile terminal, a step of generating the user number of the mobile terminal according to the physical address when the user identity is authenticated by the mobile terminal successfully.

5. The method according to claim 4, before communicating by the mobile terminal with the communication database using the identification code, the method further comprising:

unlocking the mobile terminal by the mobile terminal according to a decoding information input by the user and a preset decoding information; and performing by the mobile terminal a step of communicating with the communication database using the identification code when the mobile terminal is unlocked successfully.

6. A non-transitory computer readable storage medium storing computer executable instructions which, when executed, implement a physical address-based communication method according to claim 1.

7. The method according to claim 1, wherein generating the user number of the mobile terminal according to the physical address of the preset module comprises:

generating, by the mobile terminal, the second user number according to a Bluetooth address BD_ADDR of a Bluetooth module.

8. A mobile terminal, comprising: at least a processor; and at least a non-transitory computer readable storage medium containing instructions of programs executed by the processor, wherein the instructions comprises:

a generating circuit, a switching circuit, and a communication circuit; wherein, the generating circuit is configured to, generate a user number of the mobile terminal according to a physical address of the preset module when the mobile terminal is in a preset first communication mode; and generate an identification code of the mobile terminal according to the user number and a predetermined country code and the domestic destination code, wherein the user number comprises a first user number and a second user number;

the switching circuit is configured to, control the mobile terminal to switch from the first communication mode to a second communication mode when the mobile terminal satisfies a preset communication condition; and the communication circuit is configured to, communicate with the communication database using the identification code when the mobile terminal is in the second communication mode.

9. The mobile terminal according to claim 8, wherein the generating circuit is configured to generate, the second user number according to a Bluetooth address BD_ADDR of the Bluetooth module.

10. The mobile terminal according to claim 8, the mobile terminal further comprising: a first sending circuit and a first receiving circuit; wherein, the first sending circuit is configured to send the identification code to the communication database via a communication base station;

the first receiving circuit is configured to receive through the communication base station, a judgment result delivered by the communication database and determined according to the identification code as to whether the mobile terminal satisfies the communication condition.

11. The mobile terminal according to claim 8, wherein the mobile terminal further comprises:

an authentication circuit configured to perform authentication for an user identity of the mobile terminal according to an authentication information input by an user and a preset authentication information;

the generating circuit is configured to, generate the user number according to the physical address when the user identity is authenticated by the mobile terminal successfully.

12. The mobile terminal according to claim 11, wherein the mobile terminal further comprises:

a decoding circuit configured to unlock the mobile terminal according to a decoding information input by the user and a preset decoding information;

the communication circuit is configured to communicate with the communication database using the identification code when the mobile terminal is unlocked successfully.

13. The mobile terminal according to claim 8, wherein the generating circuit is configured to generate, the second user number according to a Bluetooth address BD_ADDR of the Bluetooth module.

* * * * *